United States Patent
Ie et al.

(10) Patent No.: US 8,396,865 B1
(45) Date of Patent: Mar. 12, 2013

(54) SHARING SEARCH ENGINE RELEVANCE DATA BETWEEN CORPORA

(75) Inventors: Eugene Ie, Mountain View, CA (US); Xuefu Wang, Sunnyvale, CA (US); Daniel J. Clancy, Los Altos, CA (US)

(73) Assignee: Google Inc., Mountain View, CA (US)

( * ) Notice: Subject to any disclaimer, the term of this patent is extended or adjusted under 35 U.S.C. 154(b) by 377 days.

(21) Appl. No.: 12/331,872

(22) Filed: Dec. 10, 2008

(51) Int. Cl.
*G06F 7/00* (2006.01)
*G06F 17/30* (2006.01)

(52) U.S. Cl. ........................ 707/723; 707/748

(58) Field of Classification Search ................ 707/723, 707/748, 999.03, 999.05
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 6,006,222 A | 12/1999 | Culliss | |
| 6,014,665 A | 1/2000 | Culliss | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |
| 6,341,283 B1 | 1/2002 | Yamakawa et al. | |
| 6,353,849 B1 | 3/2002 | Linsk | |
| 6,363,378 B1 | 3/2002 | Conklin et al. | |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

(Continued)

*Primary Examiner* — Cam Truong
(74) *Attorney, Agent, or Firm* — Fish & Richardson P.C.

(57) ABSTRACT

In general, the subject matter described in this specification can be embodied in methods, systems, and program products for providing a query to a search engine for searching a corpus of documents. A plurality of result documents are received from the search engine, each result document associated with a ranking. For a first document in the plurality, the following is performed. First, a second document in a second corpus is identified as containing content that identifies the same physical object as the first document. The second document was included in a plurality of result documents responsive to a second query of the second corpus, similar to the first query. Second, a new ranking is determined for the first document based on its ranking and relevance data associated with the second document. The relevance data is indicative of the second document's popularity as a result for the second query.

15 Claims, 5 Drawing Sheets

U.S. PATENT DOCUMENTS

| | | |
|---|---|---|
| 6,370,526 B1 | 4/2002 | Agrawal et al. |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,516,146 B2 | 4/2009 | Robertson et al. |
| 7,533,092 B2 | 5/2009 | Berkhin et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,877,404 B2 | 1/2011 | Achan et al. |
| 7,895,177 B2 | 2/2011 | Wu |
| 7,974,974 B2 | 7/2011 | Tankovich et al. |
| 7,987,185 B1 | 7/2011 | Mysen et al. |
| 8,024,325 B2 | 9/2011 | Tong et al. |
| 8,037,042 B2 | 10/2011 | Anderson et al. |
| 8,037,043 B2 | 10/2011 | Zoeter et al. |
| 8,051,061 B2 | 11/2011 | Niu et al. |
| 8,060,497 B1 | 11/2011 | Zatsman et al. |
| 8,073,772 B2 | 12/2011 | Bishop et al. |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1* | 2/2003 | Cheung et al. ............... 707/3 |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1* | 10/2003 | Ford et al. ............... 707/3 |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006740 A1 | 1/2004 | Krohn et al. |
| 2004/0034632 A1* | 2/2004 | Carmel et al. ............... 707/5 |
| 2004/0059708 A1 | 3/2004 | Dean et al. |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1* | 10/2004 | Travis, Jr. ............... 707/3 |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0240576 A1* | 10/2005 | Piscitello et al. ............... 707/3 |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2007/0005575 A1 | 1/2007 | Dai et al. |
| 2007/0038659 A1 | 2/2007 | Datar et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0192190 A1 | 8/2007 | Granville |
| 2007/0214131 A1* | 9/2007 | Cucerzan et al. ............... 707/5 |
| 2007/0233653 A1 | 10/2007 | Biggs et al. |
| 2007/0255689 A1 | 11/2007 | Sun et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |

| | | |
|---|---|---|
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1* | 3/2008 | Tang et al. .................. 707/5 |
| 2008/0082518 A1 | 4/2008 | Loftesness |
| 2008/0091650 A1 | 4/2008 | Fontoura et al. |
| 2008/0114624 A1 | 5/2008 | Kitts |
| 2008/0114729 A1* | 5/2008 | Raman et al. ................ 707/3 |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0157643 A1 | 6/2009 | Gollapudi et al. |
| 2009/0182723 A1 | 7/2009 | Shnitko et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0241472 A1 | 9/2010 | Hernandez |
| 2011/0064795 A1 | 3/2011 | Tosi et al. |
| 2011/0295844 A1 | 12/2011 | Sun et al. |
| 2012/0191705 A1 | 7/2012 | Tong et al. |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Boyan et al.; *A Machine Learning Architecture for Optimizing Web Search Engines*; Aug. 1996; Internet-based information systems-Workshop Technical Report-American Association for Artificial Intelligence, p. 1-8.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Joachims; *Optimizing search engines using clickthrough data*; 2002; Proceedings of the ACM SIGKDD International Conference on Knowledge Discovery and Data Mining, p. 133-142.

Kelly, et al.; *Implicit Feedback for Inferring User Preference: A Bibliography*; SIGIR Forum, vol. 37, No. 2 (2003), pp. 18-28.

Bar-Llan et al., "Presentation Bias is Significant in Determining User Preference for Search Results—A User X Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: TheInternational Journal of Computer and Telecommunications Networking, Jul. 2006, vol. 50, Issue 10, 19 pages.

Boldi, et al.; *The Query flow Graph: Model and Applications; CKIM '08*, Oct. 26-30, Napaya Valley, California, USA, pp. 609-661.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grečar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims et al., "Search Engines that Learn from Implicit Feedback"; Aug. 2007, IEEE Computer Society.

Linden, Greg et al., Amazon.com *Recommendations: Item-to-Item Collaborative Filtering*, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/556,143, filed Nov. 2, 2006, in Office Action mailed Apr. 20, 2011, 18 pages.

McDonnell, Philip, A., "Time Based Ranking," U.S. Appl. No. 11/870,893, filed Oct. 11, 2007, to be published by the USPTO in a file wrapper, 42 pages.

Nicole, Kristen, Heeii is StumbleUpon Plus Google Suggestions, [online], Retrieved from the Internet http://mashable.com/2007/05/15/heeii/, 11 pages.

Lemire, Daniel, *Scale and Translation Invariant Collaborative Filtering Systems*, Published in Information Retrieval, 8(1), pp. 129-150, 2005.

U.S. Patent Office, U.S. Appl. No. 11/685,095, filed Mar. 12, 2007, in Office Action mailed Feb. 8, 2010, 31 pages.

U.S. Patent Office, U.S. Appl. No. 11/685,095, filed Mar. 12, 2007, in Office Action mailed Feb. 25, 2009, 21 pages.

U.S. Patent Office, U.S. Appl. No. 11/685,095, filed Mar. 12, 2007, in Office Action mailed Sep. 10, 2009, 23 pages.

U.S. Patent Office, U.S. Appl.No. 11/685,095, filed Mar. 12, 2007, in Office Action mailed Apr. 13, 2011, 31 pages.

Radlinski, et al., *Query Chains: Learning to Rank from Implicit Feedback*, KDD '05, Aug. 21-24, 2005, Chicago, Illinois, USA, 10 pages.

Rahman, Sabana, Examiner, U.S. Patent Office, U.S. Appl. No. 11/556,086 filed Nov. 2, 2006, in Office Action mailed Jun. 23, 2010, 21 pages.

Schwab, et al., *Adaptivity through Unobstrusive Learning*, 2002, 16(3), pp. 5-9.

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

W3C, URIs, URLs and URNs: Classification and Recommendations 1.0, Report from the joint W3C/IETF URI Planning Interest Group, Sep. 21, 2001, 8 pages.

Xiao, et al., *Measuring Similarity of Interests for Clustering Web-Users*, ADC, 2001, pp. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

U.S. Appl. No. 10/726,345, filed Dec. 3, 2003, Pearson et al., System and Methods for Improved Searching.

U.S. Appl. No. 10/878,926, filed Jun. 28, 2004, Battle et al., Systems and Methods for Deriving and Using an Interaction Profile.

U.S. Appl. No. 12/551,052, filed Aug. 31, 2009, Kim et al., Refining Search Results.

U.S. Appl. No. 12/572,739, filed Oct. 2, 2009, McDonnell et al., Recent Interest Based Relevance Scoring.

U.S.Appl. No. 12/506,203, filed Jul. 20, 2009, Tong et al., Generating a Related Set of Documents for an Initial Set of Documents.

U.S. Appl. No. 12/717,064, filed Mar. 3, 2010, Kuramochi et al., Framework for Testing Search Result Hypotheses.

U.S. Appl. No. 12/632,279, filed Dec. 7, 2009, Serboncini et al., Dentification and Uses of Search Entity Transition Probabilities.

U.S. Appl. No. 12/756,749, filed Apr. 8, 2010, Lopatenko et al, Ranking Search Results Based on Similar Queries.

U.S. Appl. No. 12/723,973, filed Mar. 15, 2010, Nerurkar, Ranking Search Results Based on Anchors.

U.S. Appl. No. 12/717,475, filed Mar. 4, 2010, Thakur, et al., Deriving Site Reputation and Focus From User Feedback Statistics.

U.S. Appl. No. 12/623,276, filed Nov. 20, 2009, Kim et al., Modifying Scoring Data Based on Historical Changes.

U.S. Appl. No. 12/699,549, filed Feb. 3, 2010, Fernandes et al., Evaluating Website Properties by Partitioning User Feedback.

Zeng, et al., "Learning to Cluster Web Search Results", SIGIR '04, Proceedings of the 27th Annual International ACM SIGIR conference on research and development in information retrieval, 2004.

Joachims, "Evaluating Search Engines Using Clickthrough Data", Cornell University, Department of Computer Science, Draft, Feb. 19, 2002, 13 pages.

Jansen et al., "An Analysis of Web Documents Retrieved and Viewed", School of Information Sciences and Technology, The Pennsylvania State University, the 4$^{th}$ International Conference on Internet Computing, Las Vegas, Nevada, pp. 65-69, Jun. 23-26, 2003, 5 pages.

Soumen Chakrabarti, et al. "Enhanced Topic Distillation using Text, Markup tags, and Hyperlinks". ACM 2001, pp. 208-216.

Gabriel Somlo et al., "Using Web Hepler Agent Profiles in Query Generation", ACM, Jul. 2003, pp. 812-818.

Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

* cited by examiner

SHARING SEARCH ENGINE RELEVANCE DATA BETWEEN CORPORA

BACKGROUND

Some search engines that search a document corpus (e.g., a group of web pages) collect information pertaining to which documents users find relevant for a particular search query (e.g., the documents viewed as results for a specific query). The collected information can be used to improve the rank of relevant documents in search results. However, when new documents are introduced into a corpus, very little information on their relevance for particular searches exists. Therefore, new documents which may be highly pertinent as results for a given query can have low search result rankings that make them less likely to be noticed by users.

SUMMARY

This specification describes technologies relating to search engine ranking. In general, one aspect of the subject matter described in this specification can be embodied in a method that includes providing a first query to a first search engine for searching a first corpus of documents. A plurality of first result documents are received from the first search engine responsive to the query, each first result document being associated with a respective ranking among the first result documents. For one or more first documents in the plurality of first result documents, the following is performed. First, a distinct second document in a second corpus of documents is identified where the second document contains content that identifies a physical object that has an identification number, where the first document contains content that identifies the physical object, and where the second document was included in a plurality of second result documents responsive to a second query of the second corpus of documents, and where the second query is identical to the first query or similar to the first query. Second, a new ranking is determined for the first document in the plurality of first search result documents based on the first document's respective ranking and second relevance data associated with the second document, where the second relevance data is indicative of the second document's popularity among a population of users as a result for the second query. Other embodiments of this aspect include corresponding systems and computer program products.

These and other embodiments can optionally include one or more of the following features. Determining the new ranking for the first document can be further based upon first relevance data associated with the first document, where the first relevance data is indicative of the first document's popularity among a population of users as a result for the first query. Determining the new ranking for the first document can further include a weighting of the first relevance data and the second relevance data. The weighting can favor the first relevance data as selections of the first document as a result for the first query increase. The weighting can favor the first relevance data as views of the first document pass a threshold number of views. The physical object can be a book and the identification number can be an ISBN number. The physical object can be a product and the identification number can be a product identification number. The second query can be provided to a second search engine for searching the second corpus of documents. The second search engine can be a general content search engine and the first search engine can be a book content search engine. The documents of the first corpus can include content of a shared category and the documents of the second corpus can include content of all categories. The second query can be provided to a second search engine for searching the second corpus of documents, where the second search engine is a general content search engine and the first search engine is a specific content search engine. The relevance data associated with the second document can be based on an aggregate amount of time that the second document is selected by the users in the population. The second query can be similar to the first query if the second query and first query each include an identical term. The plurality of first result documents, or a portion thereof, can be output to a user, the output first result documents arranged according to each first result document's new ranking.

Particular embodiments of the subject matter described in this specification can be implemented to realize one or more of the following advantages. A document newly introduced into a corpus of documents searched by a search engine may benefit from existing user search patterns involving documents of similar content. The documents of similar content may be included in the same corpus or a corpus searched by a different search engine. Similarly, a search engine receiving limited traffic may gain the benefit of statistically significant user search patterns from a search engine receiving greater traffic.

The details of one or more embodiments of the invention are set forth in the accompanying drawings and the description below. Other features, aspects, and advantages of the invention will become apparent from the description, the drawings, and the claims.

DETAILED DESCRIPTION

Systems and techniques for improving search results for searches of a first corpus of documents by utilizing relevance data collected as a result of searches performed on a second corpus of documents are described herein.

Figure 1:
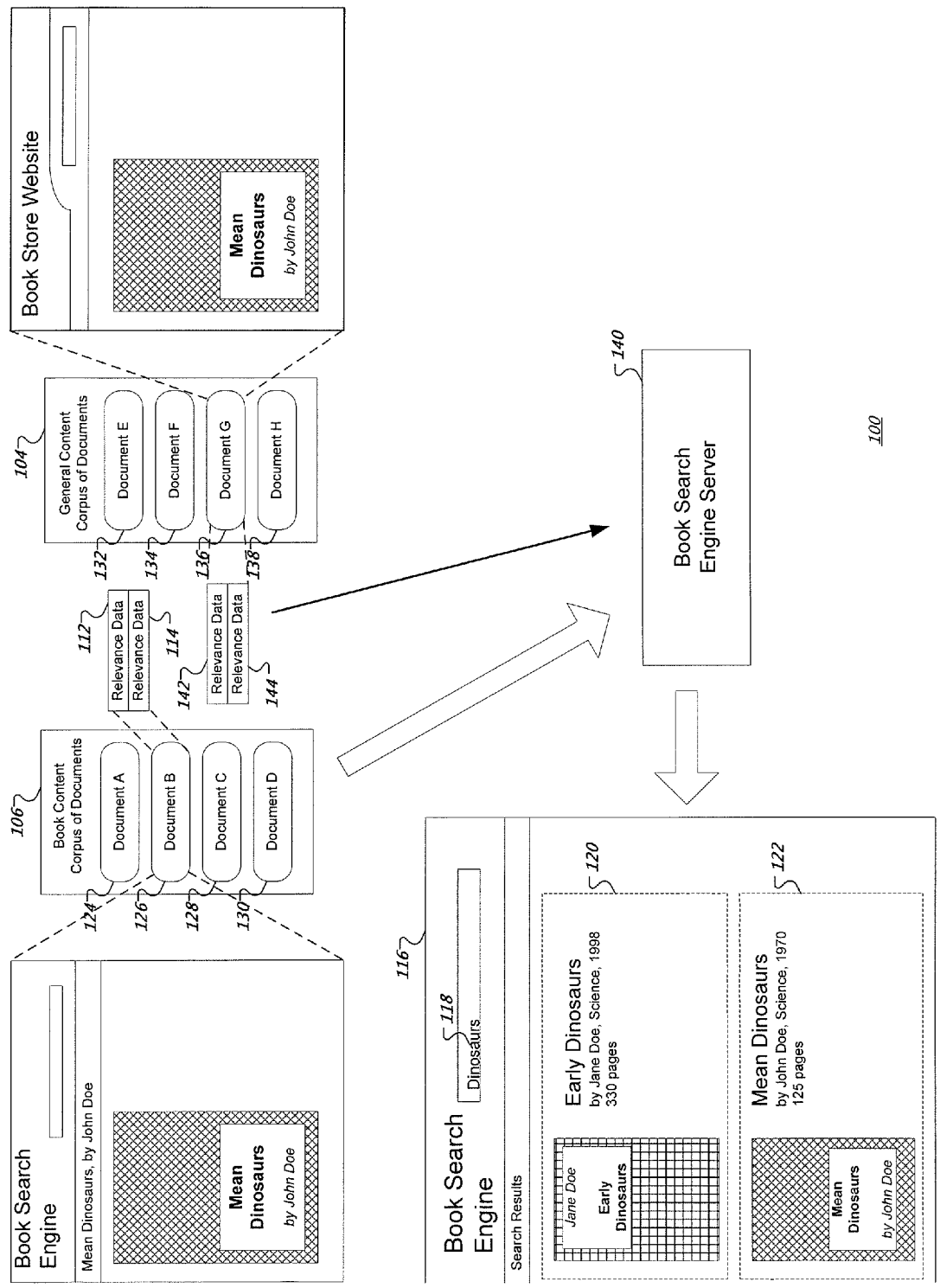
FIG. 1 shows a representation of an example system for improving the relevance of results obtained from submitting search queries.

FIG. 1 shows a representation of an example system 100 for improving the relevance of results obtained from submitting search queries. Book search engine system 100 includes a book search engine server 140 that provides a list of search results in response to a query 118 (e.g., one or more search terms from a user or a process such as an executing software application). For example, book search engine page 116 (e.g. a website) permits a user to enter the query "Dinosaurs" and receive search results 120 and 122 about the books "Early Dinosaurs" and "Mean Dinosaurs."

The search results 120 and 122 (also called result documents) correspond to documents in a corpus of book content documents 106 (e.g. a collection of web pages of the Internet relating to books or pages of books) searched by the book search engine server 140. The corpus 106 includes documents 124, 126, 128, and 130. For example, search result 122 contains a title, information, and an image corresponding to document 126 and permits a user to view the document 126 (e.g., a user may click on or otherwise select a link and visit document 126). Search results 120 and 122 are arranged according to a rank of each search result. For example, the search result 120 has a better rank than result 122 because it is closer to the top of the page 116.

When the query 118 is provided to the book search engine server 140, the book search engine server 140 generates an initial list of search results corresponding to relevant documents in the corpus 106 and provides an initial rank or score to each search result. For example, the initial rank may be based upon the prevalence of the query 118's search terms within the search result document or may be based upon how often other highly ranked documents link to the particular search result document. The initial ranking is discussed in greater detail later.

In some implementations, the initial rank of a search result is modified based upon relevance data. Relevance data indicates the relevance of a document as a search result for a given query for a population of users. For example, document 126 and corresponding search results are associated with relevance data 112 and 114 which may have been used to modify (e.g., increase or decrease) the initial rank of the search result 122. The relevance data 112 and 114 may indicate an aggregate amount of time that the document 126 is viewed by users in the population using the book search engine server 140 (e.g., whether each user views the document for a short, medium, or long amount of time). The relevance data may also indicate a number of times that the document 126 is selected by users in the population or a view (i.e., impression) to click ratio. The relevance data may further indicate a user-specified promotion or demotion of a search result. Other measures of relevance are possible.

By way of illustration, relevance data 114 may indicate the relevance of document 126 to the query "Dinosaurs" and relevance data 112 may indicate the relevance of document 126 to the query "Fish." Because the document 126 contains content about a dinosaur book, the relevance data 114 is likely to indicate a greater relevance that the relevance data 112. In some implementations, the relevance data includes click/query pairs. For instance, relevance data 114 may indicate the relevance (e.g., the "click information") of document 126 to a specific query. The click information indicates the amount of time a user viewed a document in response to the specific query. Longer dwell times on the document indicate a greater relevance. Any of the above discussed relevance data may be query specific. Other indicators of relevance are possible.

In some implementations, a separate general content search engine server (not shown) searches a corpus of general content documents 104 (i.e., a group of documents that include content of all types or categories). For example, document 132 may include content about a breed of dogs, document 134 may include content about a journal entry, and document 136 may include content about a dinosaur book. The corpus of general content documents 104 may include documents of similar content to the book content corpus of documents 106. For example, the documents of the book corpus 106 include scanned copies of books while the documents of the general corpus 106 include specific pages of a bookstore website about some of the same books.

In some implementations, the book search engine server 140 or another process identifies a document in the corpus of general content documents 104 as associated with a document in the corpus of book content documents 106. The two documents are identified as associated if they include similar content. In some implementations, the similar content is a physical object with an identification number (e.g. a book with an International Standard Book Number (ISBN) number or a product with a product number). For example, the document 136 is associated with document 126 because each document identifies a book "Mean Dinosaurs" by John Doe.

In various implementations, a primary content of each document in the corpus of general content documents 104 is identified. For example, the documents in corpus 104 that include content describing a single book are identified. In some implementations, the identification occurs by searching for a physical object's identification number. A server (e.g. server 140 or the general content search engine server) searches the corpus of general content documents 104 for ISBN numbers.

Should a searched document include a single ISBN number, the searched document is identified as containing as its primary content the book associated with the ISBN number.

Should a searched document include more than one ISBN number, the primary content of the searched document is determined by performing search queries for each ISBN number using as search terms the author or title of the book corresponding to each ISBN number. A document rank for each search is received and the query corresponding to the highest document ranking identifies the searched document's primary content. The system 100 stores the primary content of documents of the corpus 104, if any, in a repository (e.g. a database connected to the book search engine server 140 or the general content search engine server). Not only is the searched document identified as containing a primary content, but a search result corresponding to the searched document and provided in response to a query is identified as associated with the primary content.

The primary content of documents in the general content corpus of documents 104 may be determined without using an ISBN number. In some implementations, a book is identified as the primary content of a document if the document satisfies a citation criterion for the book. A citation criterion can be satisfied, for example, if a citation score of a document for a book exceeds a citation threshold.

To calculate a citation score of a document for a book, a server (e.g., book search engine server 140 or the general content search engine) first determines if the document cites to a book. A document can cite to a book if the document, for example, includes a reference to the book, such as the book title and, optionally, the author of the book. In some implementations, the server has access to a library data store that stores book metadata for many published books, including book titles, author names, ISBN numbers, year published, and other such information. This information from the library data store can be compared to content of the document to identify any book citations in the document.

The server can generate a citation score for each book cited within a document by calculating a relevance metric of the book metadata in relation to the contents of the document. For example, upon finding a book citation, the server can access book metadata for the book and compare the book metadata to the content of the document to generate a citation score for the document and the book. The citation score, in some implementations, is a measure of the relevance of the book metadata to the content of the document. In some implementations, the server can submit the book metadata as a query to the general content search engine server and an relevance score for the document can be generated by the search engine. The citation score for the document for that book is then set to this relevance score.

After citations scores are determined, the general content search engine server determines whether the citation score for a document and a book satisfies a citation criterion. In some implementations, the citation score of a particular book referenced within a document satisfies the citation criterion when the citation score of the document for the particular book exceeds a citation threshold, and when citation scores of the document for any other books referenced in the document are each less than the citation score for the particular book. In some implementations, a citation score can satisfy the citation criterion if the citation score for a particular book is at least a predetermined percentage greater than the citation scores for the other books cited within the same document (e.g., at least two times greater). If a citation score for a particular book cited in a document is determined to satisfy the citation criteria, then the book is identified as the primary content of the document.

In some implementations, the primary content of documents in the book content corpus of documents 106 is identified by ISBN numbers or other unique identifiers entered when the documents (e.g., scanned books or pages of books) are entered into the corpus 106. In other implementations, procedures similar to those described above regarding the corpus of general content documents 104 is performed on the corpus of book content documents 106.

In some implementations, the search engine server 140 modifies the initial ranking of search result 122 corresponding to document 126 based upon relevance data of associated document 136 (i.e., relevance data 142 and 144). The relevance data 142 and 144 identifies information similar to relevance data 112 and 114, but the information indicates relevance of the document 136 to users of the general content search engine server (not the book search engine server 140). For example, relevance data 144 may indicate the relevance of document 136 to the query "Dinosaurs" (e.g. a number of views of the document 136 in result to the query "Dinosaurs"). The book search engine server 140 may not receive as much traffic as the general content search engine server, so it benefits by "borrowing" relevance data from associated documents.

The book search engine server 140 checks the repository to determine associations between documents in corpus 106 and corpus 104. The checking may occur, for example, with each query of the book search engine server 140 (in which case, pertinent relevance data would be used by server 140 in modifying initial search result rankings). The checking may also occur periodically, in which case relevance data of associated documents in corpus 104 is stored by the book search engine server 140 for immediate access upon processing of a query 118.

In some implementations, in determining the modified ranking of a search result 122, the book search engine server 140 weighs the relevance data of the corresponding document 126 and its associated document 136 from the corpus of general content documents 104 (e.g., relevance data 114 of document 126 and relevance data 144 of document 136 are weighted). In various implementations, the information or data of 114 and 144 is generated through user interaction or activity associated with each respective search engine server. If the activity corresponding to the relevance data 114 is below a low threshold, the system 140 only uses the relevance data 144. However, if activity corresponding to the relevance data 114 is above a high threshold, the system 140 only uses the relevance data 114. Still, if the activity corresponding to the relevance data 114 is between the low and high thresholds, the system 140 may average or otherwise combine relevance data 114 and 144.

In some implementations, the book search engine server 142 favors the relevance data 144 as the corresponding activity increases. In other implementations, the system 142 favors the relevance data 114 as the corresponding activity increases in proportion to the corresponding activity of the relevance data 144.

In some implementations, more than one document from the corpus of general content documents 104 is associated with document 126 of corpus 106. For example, document 134 may, like document 136 and document 126, contain content about a book "Mean Dinosaurs." In such implementation, numerous methods of determining which relevance data from the corpus 104 to use are feasible. The relevance data of sister documents 134 and 136 in the corpus 104 may be averaged. The relevance data with the most favorable or least favorable values from the sister documents may be used. The relevance data of the sister documents may be aggregated. Also, system 100 may overwrite in the repository a document previously associated with a document of the corpus 106, effectively only allowing association with one document (and one set of relevance data).

It should be understood that the use of search engine servers and corpora of documents corresponding to books and general content matter is for illustrative purposes only. In various implementations, the described system can work with any collection of physical or electronic objects having unique identifiers. The corpus of book content documents 106 may instead include documents associated with any specific content, type, topic, category, or subject or may even include documents of general content. For example, the corpus 106 may include documents including content of a shared category (e.g., news articles, products, images, videos, blog entries, user group entries, etc.). A search engine searching such category is considered a specific content search engine. A search engine may search more than one or all categories is considered a general content search engine. The corpus of general content documents 104 similarly may include documents addressing any type, general or specific. Further, the book search engine server 140 may include several servers or computerized devices performing the operations described above. Example components of the server 140 are described in systems 200 and 300.

Figure 2:
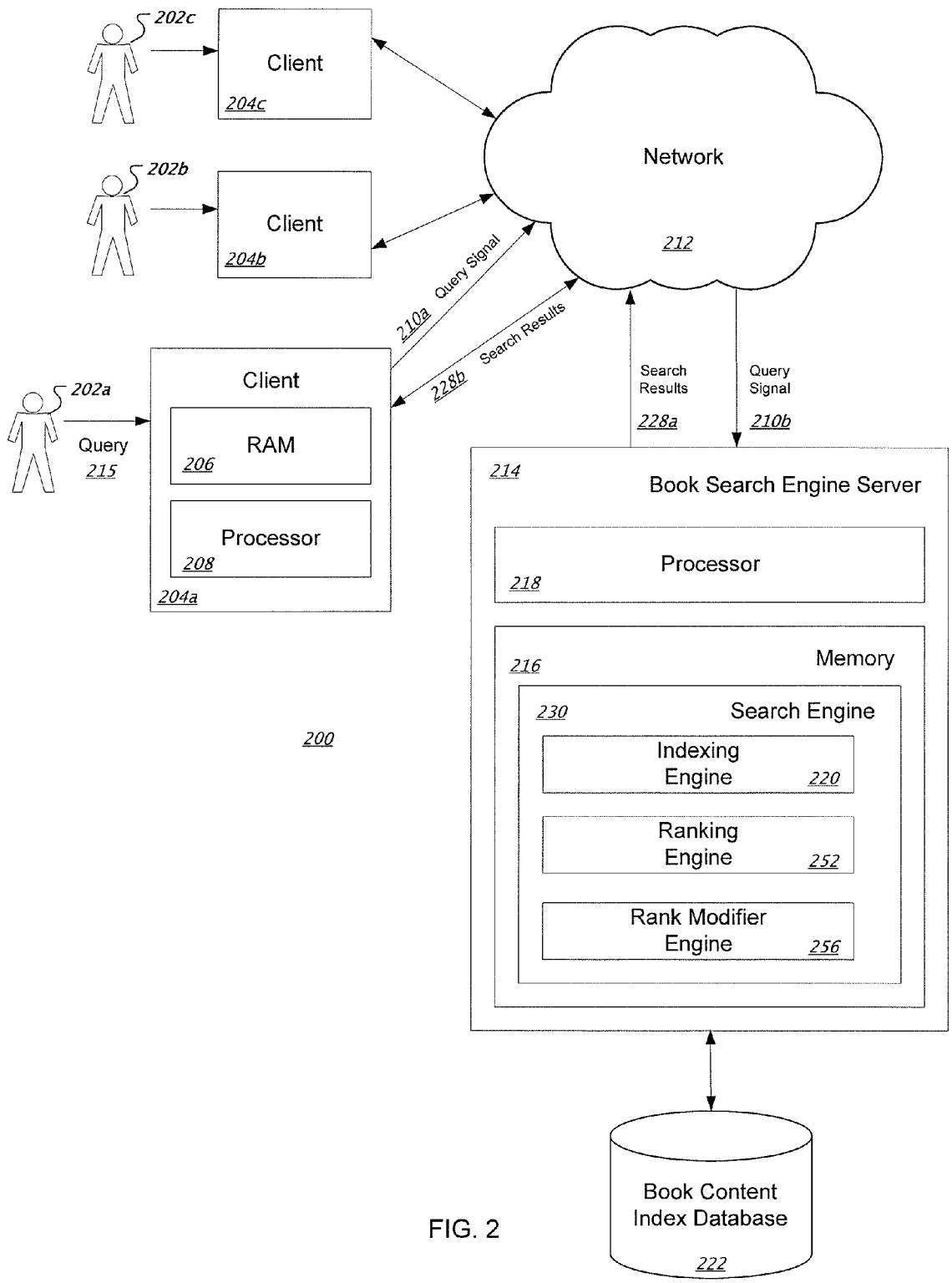
FIG. 2 shows an example system for improving the relevance of results obtained from submitting search queries.

FIG. 2 shows an example system 200 for improving the relevance of results obtained from submitting search queries. The system 200 is an example of the system 100 implemented in an Internet, intranet, or other client/server environment. Although several components are illustrated, there may be fewer or more components in the system 200. Moreover, the components can be distributed on one or more computing devices connected by one or more networks or other suitable communication mediums.

A user 202 (202a, 202b, 202c) interacts with the system 200 through a client device 204 (204a, 204b, 204c) or other device. For example, the client device 204 can be a computer terminal within a local area network (LAN) or within a wide area network (WAN). The client device 204 includes a random access memory (RAM) 206 (or other memory and/or a storage device) and a processor 208. The processor 208 is structured to process instructions within the system 200. In some implementations, the processor 208 is a single threaded processor. In other implementations, the processor 208 is a multi-threaded processor. The processor 208 can include multiple processing cores and is structured to process instructions stored in the RAM 206 (or other memory and/or a storage device included with the client device 204) to display graphical information for a user interface.

A user 202a connects to the search engine 230 within a book search engine server 214 to submit a query 215. The book search engine server 214 and the query 215, for instance, are the same as the server 140 and the query 118, respectively, of FIG. 1. When the user 202a submits the query 215 through an input device attached to a client device 204a, a client-side query signal 210a is sent into a network 212 and is forwarded to the book search engine server 214 as a server-side query signal 210b. In some implementations, the server 214 is one or more server devices in one or more locations.

Book search engine server 214 includes a memory device 216, which includes the search engine 230 loaded therein. A processor 218 is configured to process instructions within the server 214. These instructions can implement one or more components of the search engine 230. The processor 218 may be a single-threaded processor or a multi-threaded processor and may include multiple processing cores. The processor 218 processes instructions stored in the memory 216 related to the search engine 230 and sends information to the client device 204, through the network 212, to create a graphical presentation in a user interface of the client device 204 (e.g., a search results web page displayed in a web browser). In some implementations, the graphical presentation is the page 116 in FIG. 1.

The server-side query signal 210b is received by the search engine 230. The search engine 230 uses the information within the user query 215 (e.g., query terms) to find relevant documents. In some implementations, the search engine 230 includes an indexing engine 220 that actively searches a corpus (e.g., the corpus of book content documents 106 or web pages on the Internet) to index the documents found in that corpus, and the index information for the documents in the corpus is stored in a book content index database 222. This index database 222 is accessed to identify documents related to the user query 215. Note that, an electronic document (which for brevity will simply be referred to as a document) does not necessarily correspond to a file. A document can be stored in a portion of a file that holds other documents, in a single file dedicated to the document in question, or in multiple coordinated files.

In some implementations, the search engine 230 includes a ranking engine 252 to rank the documents related to the user query 215. The ranking of the documents is performed, for instance, using techniques for determining an information retrieval (IR) score for indexed documents in view of a given query. By way of illustration, the relevance of a particular document with respect to a particular search term or to other provided information may be determined by any appropriate technique. For example, the general number of back-links to a document that contains matches for a search term is used to infer a document's relevance. In particular, if a document is linked to (e.g., is the target of a hyperlink) by many other relevant documents (e.g., documents that also contain matches for the search terms), it can be inferred that the target document is particularly relevant. This inference is made because the authors of the pointing documents presumably point, for the most part, to other documents that are relevant to their audience.

If the pointing documents are in turn the targets of links from other relevant documents, they can be considered more relevant, and the first document is considered particularly relevant because it is the target of relevant (or even highly relevant) documents. Such a technique is the determinant of a document's relevance or one of multiple determinants. In some implementations, appropriate techniques are also utilized to identify and eliminate attempts to cast false votes so as to artificially drive up the relevance of a page.

To further improve such traditional document ranking techniques, the ranking engine 252 receives an additional signal from a rank modifier engine 256 to assist in determining an appropriate ranking for the documents. The rank modifier engine 256 provides one or more measures of relevance for the documents (e.g. relevance data 112, 114, 142, and 144 from FIG. 1), which can be used by the ranking engine 252 to improve the search results' ranking provided to the user 202. The rank modifier engine 256 performs one or more of the operations described further below to generate the one or more measures of relevance.

The search engine 230 forwards the final, ranked result list within a server-side search results signal 228a through the network 212. Exiting the network 212, a client-side search results signal 228b is received by the client device 204a where the results are stored within the RAM 206 and/or used by the processor 208 to display the results on an output device for the user 202a.

Figure 3:
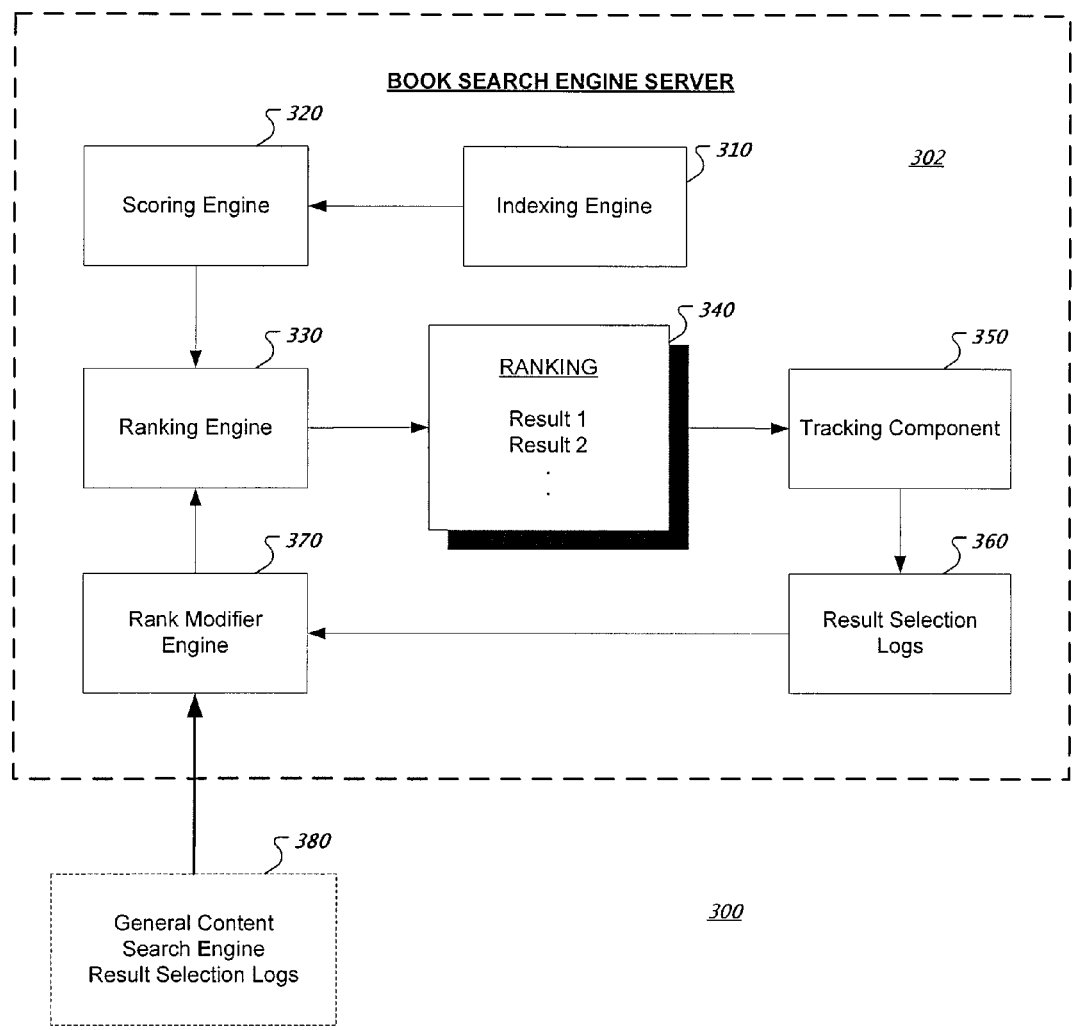
FIG. 3 shows example components of a system for improving the relevance of results obtained from submitting search queries.

FIG. 3 shows example components of a system 300 for improving the relevance of results obtained from submitting search queries. These components include an indexing engine 310, a scoring engine 320, a ranking engine 330, and a rank modifier engine 370. The indexing engine 310 functions as described above for the indexing engine 220. In addition, the scoring engine 320 generates scores (e.g. initial rankings) for search results based on many different features, including content-based features that link a query to search results, and query-independent features that generally indicate the quality of documents results. The content-based features include aspects of document format, such as query matches to title or anchor text in an HTML (Hyper Text Markup Language) page. The query-independent features include aspects of document cross-referencing. Moreover, the particular functions used by the scoring engine 320 can be tuned to adjust the various feature contributions to the final IR score, using automatic or semi-automatic processes.

The ranking engine 330 produces a ranking of search results 340 for display to a user based on IR scores received from the scoring engine 320 and one or more signals from the rank modifier engine 370. A tracking component 350 records information regarding individual user selections of the results presented in the ranking 340. In some implementations, the tracking component 350 is embedded JavaScript code included in a web page ranking 340 that identifies user selections (clicks) of individual search results and also identifies when the user returns to the results page, thus indicating the amount of time the user spent viewing the selected document result. In other implementations, the tracking component 350 is a proxy system through which user selections of the search results are routed, or the tracking component includes pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information is stored in result selection logs 360. In some implementations, the recorded information includes log entries that indicate, for each user selection, the query (Q), the document (D), the time (T) on the document, the language (L) employed by the user, and the country (C) where the user is likely located (e.g., based on the server used to access the IR system). In further implementations, other information is recorded regarding user interactions with a presented ranking, including negative information, such as the fact that a document result was presented to a user, but was not clicked, position(s) of click(s) in the user interface, IR scores of clicked results, IR scores of all results shown before click, the titles and snippets shown to the user before the click, the user's cookie, cookie age, IP (Internet Protocol) address, user agent of the browser, etc. In other implementations, similar information (e.g., IR scores, position, etc.) is recorded for an entire session, or multiple sessions of a user, including potentially recording such information for every click that occurs both before and after a current click.

The information stored in the result selection logs 360 (e.g. relevance data 112 and 114 is included in this information) is used by the rank modifier engine 370 in generating the one or more signals to the ranking engine 330. In general, a wide range of information is collected and used to modify or tune the click signal from the user to make the signal, and the future search results provided, a better fit for the user's needs. Thus, user interactions with the rankings presented to the users of the information retrieval system can be used to improve future rankings.

In some implementations, information stored in general content search engine result selection logs 380 (e.g. relevance data 142 and 144 is included in this information) is used by the rank modifier engine 370 in generating one or more signals to the ranking engine 330. The information in logs 380 is created by the general content search engine server (discussed in relation to FIG. 1) in a manner similar to the creation of the information in the logs 360 by the book search engine server 302. In some implementations, the book search engine server 302 periodically retrieves information from the logs 380 and stores the information locally for immediate access.

The components shown in FIG. 3 can be combined in various manners and implemented in various system configurations. For example, the scoring engine 320 and the ranking engine 330 can be merged into a single ranking engine, such as the ranking engine 252 of FIG. 2. The rank modifier engine 370 and the ranking engine 330 can also be merged, and in general, a ranking engine includes any software component that generates a ranking of search results after a query. Moreover, a ranking engine can be included in a client system in addition to (or rather than) in a server.

Figure 4:
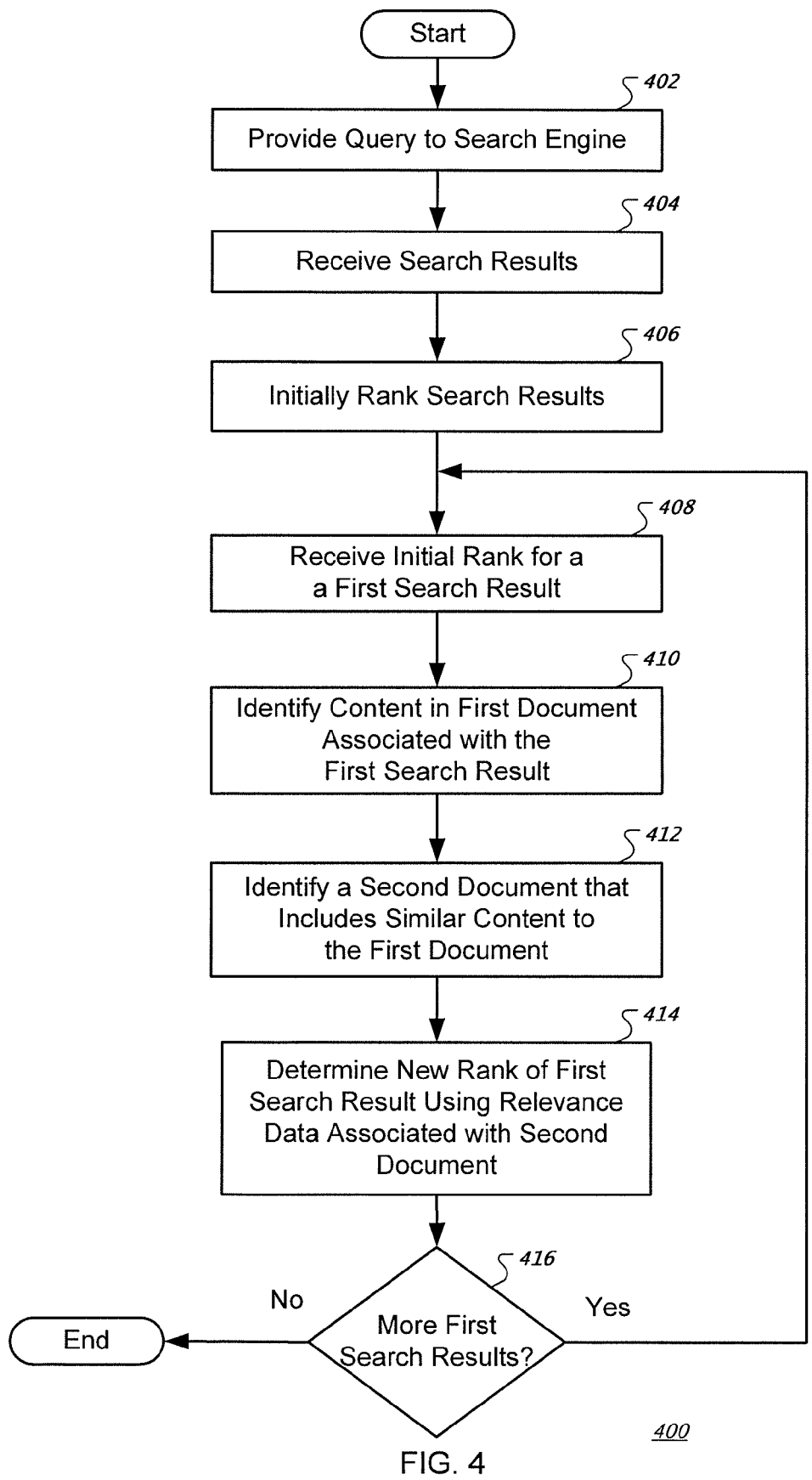
FIG. 4 shows a flow chart of an example process for improving the relevance of results obtained from submitting search queries.

FIG. 4 shows a flow chart of an example process for improving the relevance of results obtained from submitting search queries. The process 400 may be performed, for example, by systems such as the system 100 in FIG. 1, system 200 in FIG. 2, and system 300 in FIG. 3 as the basis of an example for describing the process. Another system or combination of systems, however, may be used to perform the process 400.

In box 402, a query is provided to a search engine. The query is provided by a user of the search engine or by a system for searching documents in a corpus of documents. For example, the book search engine server 140 in FIG. 1 receives a query 118 from a user entering the query on the book search engine web page 116.

In box 404, search results are received. For example, the scoring engine 320 receives a list or a plurality of search results relevant to the query 118 from the indexing engine 310. Each search result represents or corresponds to a document in the corpus of documents. For example, the received search results (that are not shown) correspond to documents 124, 126, 128, and 130 in the corpus of book content documents 106.

In box 406, an initial rank or score is provided to each of the received search results based upon each corresponding document's relevance to the query. For example, the scoring engine 320 provides an initial rank to each of the received search results corresponding to documents 124, 126, 128, and 130. The search results are initially ranked based upon their corresponding documents' relevance to the query 118 "Dinosaurs."

In box 408, an initial rank for a first search result (i.e., a single search result from the plurality of search results) is received. For example, the ranking engine 330 receives an initial rank for the search result corresponding to the document 126.

In box 410, content of a first document (i.e., a document corresponding to the first search result) is identified. In some implementations, the identified content includes physical objects (e.g., books or products). In other implementations, the physical objects include identification numbers (e.g., an ISBN number for a book or a product number for a product). For example, the book search engine server 140 identifies the book "Mean Dinosaurs" by John Doe as the content of document 126.

In other implementations, a non-physical object is identified as the content of the first document. For example, an electronic version of a book, a journal entry, a blog posting, a website, a song, or a video may be identified as the content of the first document. The non-physical object may include an identification number (e.g. an ISBN number for an electronic book or database tags or labels for digital content). In some implementations, only content of a particular type or subject matter is identified (e.g. only books are identified; not journal entries, newspaper articles, etc.). In some implementations, no content is identified for the first document and the operation of box 408 is followed by the determination of box 414.

In box 412, a second document is identified that includes content similar or the same as the content of the first document. In some implementations the second document is from a separate, second corpus of documents searched by a separate search engine. For example, the book search engine server 140 identifies the document 136 from corpus 104 as including content similar to the content of the document 126. Both the document 126 and 136 include content about the book "Mean Dinosaurs" by John Doe. In some implementations, the second document is from the same corpus of documents as the first document (e.g., the book search engine server 140 identifies document 130 as including content about the book "Mean Dinosaurs"). In other implementations, the book search engine server 140 identifies more than one document that includes content about the book "Mean Dinosaurs" (e.g., the documents 134 and 136).

In box 414, a new or modified rank of the first search result is determined using relevance data associated with the second document. In some implementations, the relevance data identifies information regarding user interaction with a search result corresponding to the second document. For example, the information may include a number of selections of the search result as a result for a query, a length of selections of the search result as a result for a query, an indication of previewing the second document as a result for the query, etc.

In some implementations, the relevance data is the relevance data 142 and 144 of FIG. 1. For example, as a result of the query 118 for "Dinosaurs," the initial rank for the search result associated with document 126 is modified using relevance data 144 of the document 136. The relevance data 144 indicates a vector of the length of user selections of document 136 for the query "Dinosaurs" (or a query that contains the term "Dinosaurs").

In box 416, a determination is made whether there are additional search results from the plurality of received search results for which the operations of boxes 408 through 414 has not been performed. If such an additional search result exists, the process performs the operations of boxes 408 through 412 for the additional search result (i.e., the new "first search result"). For example, the process 400 performs the operations of boxes 408 through 412 for the search results related to documents 124, 128, and 130 (the operations were already performed for the search result related to document 126). If no such additional search result exists, the process ends.

Figure 5:
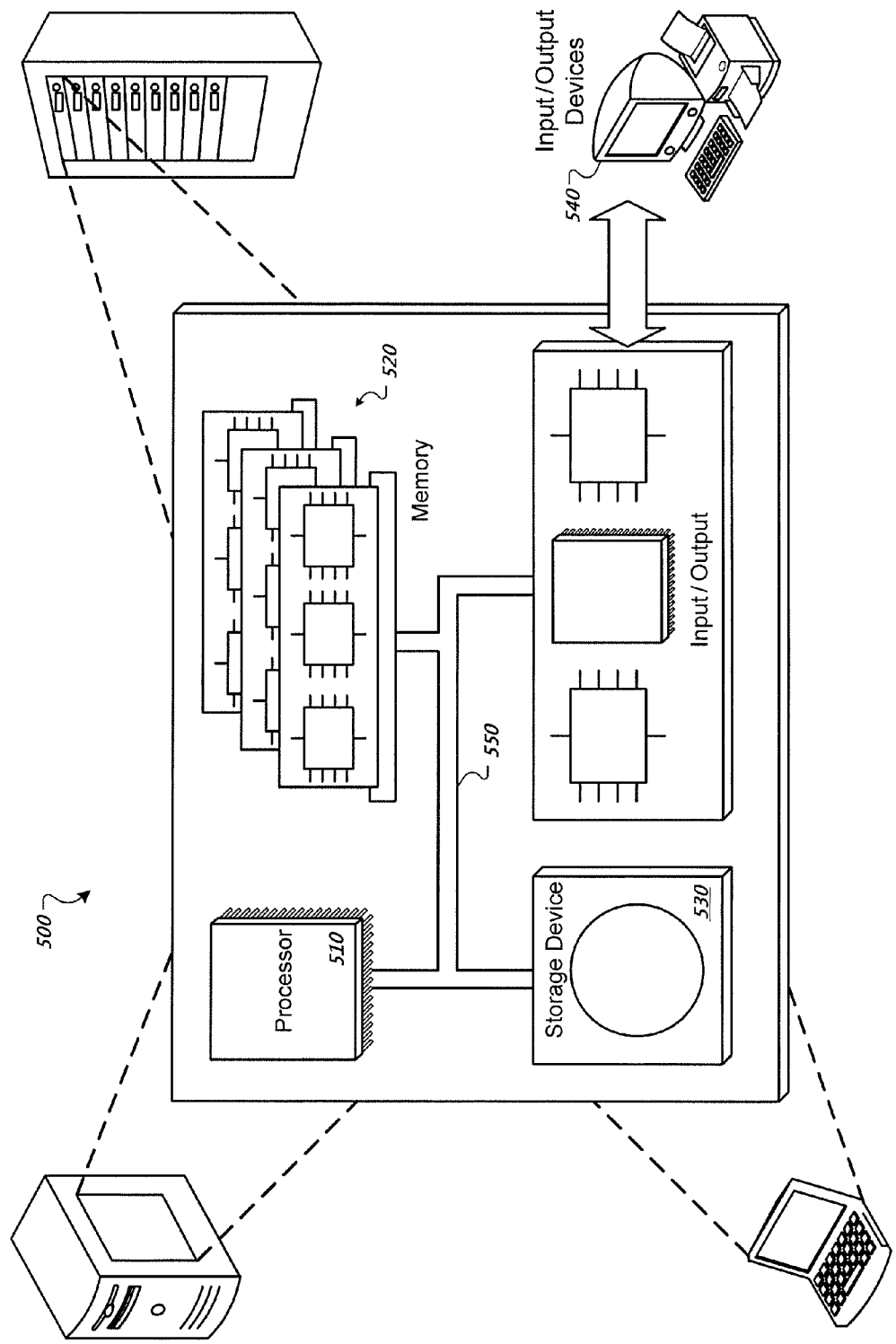
FIG. 5 is a schematic diagram of a computer system. Like reference symbols in the various drawings indicate like elements.

FIG. 5 is a schematic diagram of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:
1. A computer-implemented method comprising:
   providing, by a computing system, a first query to a first search engine for searching a first corpus of documents;
   receiving, by the computing system and from the first search engine, a plurality of first search results that are responsive to the first query, each first search result corresponding to a first result document, each first search result being associated with a respective ranking among the first search results; and for at least a particular search result that corresponds to a particular document and that is in the plurality of first search results, performing the following:

identifying, by the computing system, second relevance data that is indicative of a second search result's popularity as having been selected by a population of users as a result for a second query that is identical to the first query or similar to the first query, the second relevance data being identified based on the second search result corresponding to a second document that contains content that identifies a physical object that is also identified by content in the particular document; and determining, by the computing system, a new ranking for the particular search result among the plurality of first search results based on the particular search result's ranking and the second relevance data that is indicative of the second search result's popularity as having been selected by the population of users as the result for the second query, wherein determining the new ranking for the particular search result is further based upon first relevance data that is indicative of the particular search result's popularity as having been selected by a first population of users as a result for the first query, wherein determining the new ranking for the particular search result further comprises a weighting of the first relevance data and the second relevance data, and wherein the weighting favors the first relevance data as selections of the particular search result as a result for first query increase.

2. The method of claim 1, wherein the weighting favors the first relevance data as selections of the particular search result pass a threshold number of selections.

3. The method of claim 1, wherein:
the physical object is a book; and
the content of the second document identifies the physical object with an ISBN number and the content of the particular document identifies the physical object with the ISBN number.

4. The method of claim 1, wherein:
the physical object is a product; and
the content of the second document identifies the physical object with a product identification number and the content of the particular document identifies the physical object with the product identification number.

5. The method of claim 1, wherein:
the second document is from a second corpus of documents; and
the second query was provided to a second search engine for searching the second corpus of documents.

6. The method of claim 5, wherein the second search engine is a general content search engine and the first search engine is a book content search engine.

7. The method of claim 1, wherein:
the second document is from a second corpus of documents; and
the documents of the first corpus include content of a shared category and the documents of the second corpus include content of all categories.

8. The method of claim 1, wherein:
the second document is from a second corpus of documents;
the second query was provided to a second search engine for searching the second corpus of documents; and
the second search engine is a general content search engine and the first search engine is a specific content search engine.

9. The method of claim 1, wherein the second relevance data is based on an aggregate amount of time that the second document is viewed by the users in the population in response to the users in the population selecting the second search result as a result for the second query.

10. The method of claim 1, wherein the second query is similar to the first query if the second query and first query each include an identical term.

11. The method of claim 1, further comprising outputting the plurality of first search results, or a portion thereof, to a user, the output first result documents arranged, at least in part, according to the particular search result's new ranking.

12. A computer program product tangibly embodied in one or more non-transitory computer-readable storage mediums and comprising instructions that when executed by one or more processors perform operations comprising:

providing a first query to a first search engine for searching a first corpus of documents;

receiving, from the first search engine, a plurality of first search results that are responsive to the first query, each first search result corresponding to a first result document, each first search result being associated with a respective ranking among the first search results; and for at least a particular search result that corresponds to a particular document and that is in the plurality of first search results, performing the following:

identifying second relevance data that is indicative of a second search result's popularity as having been selected by a population of users as a result for a second query that is identical to the first query or similar to the first query, the second relevance data being identified based on the second search result corresponding to a second document that contains content that identifies a physical object that is also identified by content in the particular document; and determining a new ranking for the particular search result among the plurality of first search results based on the particular search result's ranking and the second relevance data that is indicative of the second search result's popularity as having been selected by the population of users as the result for the second query, wherein determining the new ranking for the particular search result is further based upon first relevance data that is indicative of the particular search result's popularity as having been selected by a first population of users as a result for the first query, wherein determining the new ranking for the particular search result further comprises a weighting of the first relevance data and the second relevance data, and wherein the weighting favors the first relevance data as selections of the particular search result as a result for first query increase.

13. A system, comprising:
one or more non-transitory computer-readable mediums including instructions;
one or more processors configured to execute the instructions to perform operations comprising:
providing a first query to a first search engine for searching a first corpus of documents;
receiving, from the first search engine, a plurality of first search results that are responsive to the first query, each first search result corresponding to a first result document, each first search result being associated with a respective ranking among the first search results; and for at least a particular search result that corresponds to a particular document and that is in the plurality of first search results, performing the following:

identifying second relevance data that is indicative of a second search result's popularity as having been selected by a population of users as a result for a second query that is identical to the first query or similar to the first query, the second relevance data being identified based on the second search result corresponding to a second document that contains content that identifies a physical object that is also identified by content in the particular document; and determining a new ranking for the particular search result among the plurality of first search results based on the particular search result's respective ranking and the second relevance data that is indicative of the second search result's popularity as having been selected by the population of users as the result for the second query, wherein determining the new ranking for the particular search result is further based upon first relevance data that is indicative of the particular search result's popularity as having been selected by a first population of users as a result for the first query, wherein determining the new ranking for the particular search result further comprises a weighting of the first relevance data and the second relevance data, and wherein the weighting favors the first relevance data as selections of the particular search result as a result for first query increase.

14. The system of claim 13, wherein the second query is similar to the first query if the second query and first query each include an identical term.

15. The system of claim 13, wherein the operations further comprise outputting the plurality of first search results, or a portion thereof, to a user, the output first result documents arranged, at least in part, according to the particular search result's new ranking.

\* \* \* \* \*

UNITED STATES PATENT AND TRADEMARK OFFICE
CERTIFICATE OF CORRECTION

| | | |
|---|---|---|
| PATENT NO. | : 8,396,865 B1 | Page 1 of 1 |
| APPLICATION NO. | : 12/331872 | |
| DATED | : March 12, 2013 | |
| INVENTOR(S) | : Ie et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this
Twenty-fifth Day of November, 2014

Michelle K. Lee
*Deputy Director of the United States Patent and Trademark Office*